United States Patent Office 3,352,971
Patented Nov. 14, 1967

3,352,971
SYSTEM FOR CHARGING AMOUNTS RECORDED BY CONSUMPTION AND SERVICE-METERS
Nils Emil Nilsson, Essingebrogatan 12, and Arne Ingemar Olofsson, Nybohovsbacken 91, both of Stockholm, Sweden
Filed Feb. 8, 1963, Ser. No. 257,181
Claims priority, application Sweden, May 2, 1962, 4,889/62
8 Claims. (Cl. 179—2)

ABSTRACT OF THE DISCLOSURE

The system is for a remotely controlled service-metering system. A meter at the subscriber's installation measures the use of the service and gives an alarm signal to the subscriber to indicate a payment is due after a certain amount of the service has been utilized. If the subscriber pays a required charge to a central office, the office sends a "receipt" signal to the subscriber's installation resetting the meter and removing the alarm signal. If the payment is not made, the receipt signal is not sent. Then, after another quantity of the service is utilized, the service is automatically suspended.

---

This invention refers to a device for use in service or consumers' meters, for charging the consumer an amount recorded by said meter. Meters of this kind are used for different purposes, such as metering the consumption of water, gas and electricity or registering of a service, such as the provision of telephone calls. The consumption meters are normally located in the subscribers' premises. A meter for telephone calls can be operated through the telephone line and may thus also be installed on the subscriber's premises. In both cases the payment is made subsequently and, according to established regulations, an amount corresponding to the consumption registered by the meter, is to be charged and collected.

It is an object of the invention to provide a device that partly automatically calls the attention of the subscriber by giving a "Payment due" signal, when an allowed consumption quantity has been used, and partly records a "Receipt" signal transmitted by the party that receives the payment, i.e. the Public Service Office, in the following referred to as the Office. The "Payment due" signal is obtained by means of a signalling device, such as a signal lamp or the like, installed in a conveniently conspicuous place at the subscriber's premises and energized in a circuit operated by the counting mechanism of a meter every time the allowed consumption quantity has been reached. The "Receipt" signal consists in the turning off of the "Payment due" signal and is obtained by means of an electromagnet that is energized by a tone signal transmitted by the Office over a telecommunication channel, for instance an ordinary telephone line, when payment has been received. If payment is not duly made upon a "Payment due" signal, this signal remains in force and the service controlled by the meter—or at least part of it—is automatically suspended as soon as the meter has recorded a predetermined additional consumption quantity, the size of which may be prescribed by regulations.

The invention will be further described with reference to the attached drawings, FIGS. 1 to 4.

Figure 1:
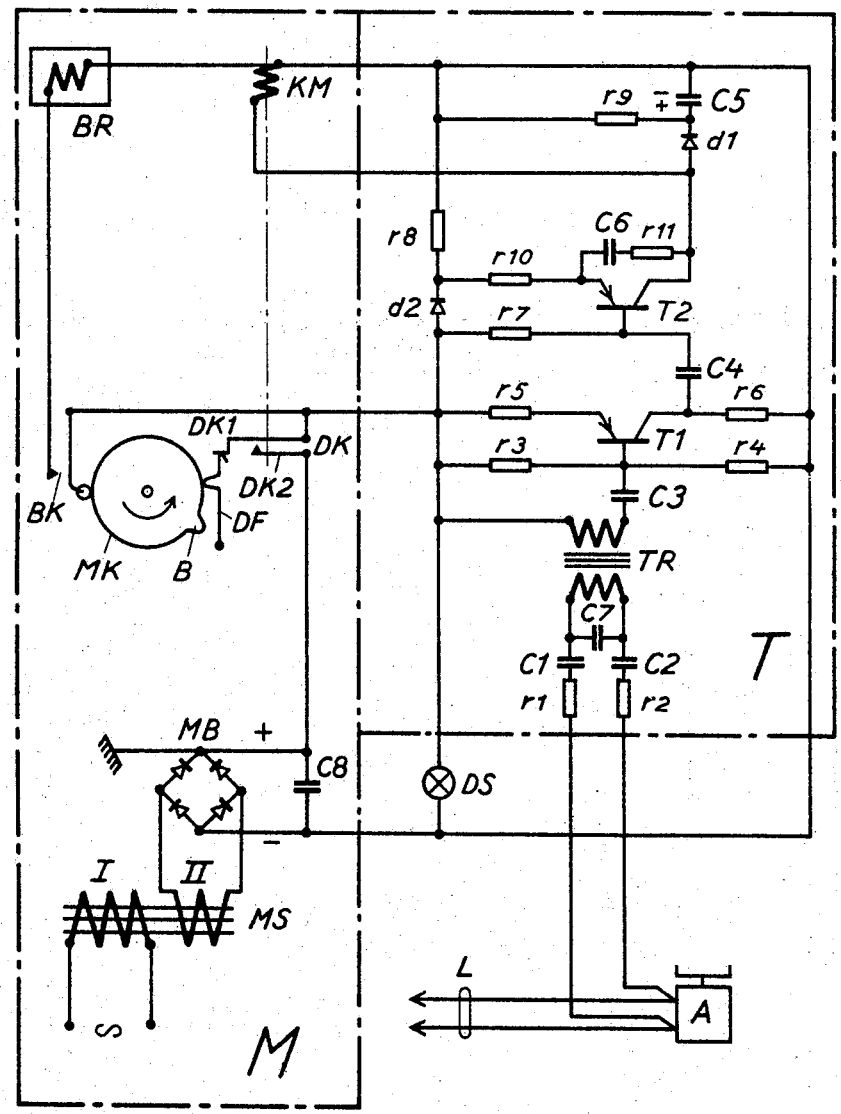
FIG. 1 shows an electricity meter M, a signal receiver T and a telephone station A.

In FIG. 1, MK is the disc impelled by the counting mechanism of an electricity meter M. Only a transformer MS is shown comprising a main winding I and a secondary winding II. By means of a rectifier bridge MB connected to the secondary winding, and a smoothing condenser C8, a D.C.-supply is furnished for operation of the tone signal receiver T. The rotatable disc MK operates partly a locking spring DF, and partly a contact spring BK. The locking spring controls a contact spring DK1, which latter is operated by the electromagnet KM. The contact spring BK closes a circuit for an automatic switch, or a circuit through a fuse BR.

The tone signal receiver T consists of two high resistances $r1$ and $r2$, a transformer TR, a filter C1, C2, C7, two transistors T1 and T2, a delay line $c5$, $r9$, $d1$ and a number of resistances and condensers for controlling the transistors.

In the figure there is also shown a signal lamp DS, arranged to be lighted when payment is required, and furthermore a signalling channel consisting of a pair of telephone wires. The telephone instrument A and the tone signal receiver T are connected in parallel to the telephone line L.

The disc MK is provided with a cam B and is rotated in the direction indicated by an arrow. The upper contact spring DK1 of the make contacts DK rests on the locking spring DF. When the cam B actuates the locking spring DF, the make contacts DK close and remain closed until the spring DK1 is operated by the magnet KM.

When the contacts DK are closed, the lamp DS is lighted and simultaneously a circuit is closed from the D.C.-supply MB–C8, through the resistances $r3$ and $r4$, thus activating the transistor T1. Current then flows through the resistance $r5$, the emitter and collector of the transistor T1, and through the resistance $r6$. The condenser C4 is charged by current through the resistance $r7$ whereafter the transistor T2 is blocked as long as the transistor T1 is activated.

When the lamp DS is lighted, the subscriber is supposed to pay an amount of money corresponding to a predetermined number of kilowatt hours at a predetermined price. When this is done and the payment is received, the lamp DS is to be switched off by means of opening the contacts DK. This is accomplished by means of the magnet KM that is energized by means of a signal through the telephone wires L, to the tone signal receiver T. This signal is transmitted by the Office and is preferably carried out simultaneously with the crediting operation of the subscriber's account. The Office sends through the communication channel a tone signal of a long duration and of a relatively high frequency and voltage. This signal passes through the resistances $r1$ and $r2$, the filter C1, C2, C7, the transformer TR and condenser C3. Thus an A.C.-current passes through the resistance $r3$. This A.C.-current is amplified by the transistor T1 to an A.C.-current in the circuit $r5$, T1, C4, $r7$. The current through the resistance $r7$ biases the emitter-base current of the transistor T2 and a current passes through the rectifier $d2$, resistance $r10$, transistor T2, rectifier $d1$ and the electrolytic condenser C5. This current being a pulsating D.C.-current charges the electrolytic condenser C5. If the signal is of a sufficient duration the condenser C5 will be charged to so high a voltage that the electromagnet KM operates its armature thereby lifting the contact springs DK1 and DK2, without opening the contacts DK. The locking spring DF falls back against the disc MK and when the signal ceases, the relay KM releases its armature. The contact spring DK1 will be held in the locked position by the tip of the DF-spring, while the contact spring DK2 opens the contact DK.

When the signal ceases, the condenser C5 is discharged through the resistance $r9$.

In order to protect the transistor T2 against high voltages, a condenser C6 is provided in series with a current limiting resistance r11. The rectifier d2 and the resistance r8 constitute a voltage divider, which prevents leakage current through the transistor T2 when there is no signal.

There must be no possibility for the subscriber to produce a "Receipt"-signal by means of the transmitter of the telephone A. To be able to connect the tone-signal receiver directly to the telephone wires L, it is necessary that the resistances r1 and r2 be of such a high value that the required amplitude of the signal current is higher than the amplitude of signals with the same frequencies that might be generated by means of the transmitter of the telephone A. This disadvantage may be completely eliminated by connecting the tone signal receiver in parallel with the telephone receiver, which latter always is antiside tone connected with respect to the transmitter. Another alternative is to connect the tone signal receiver T in parallel to the ringer, which latter is disconnected by the cradle switch contacts when the transmitter is removed. In this latter alternative the subscriber must replace the hand-set when the "Receipt"-signal is to be received. In this case he may also control that the "Payment due"-lamp goes out.

Figure 2A:
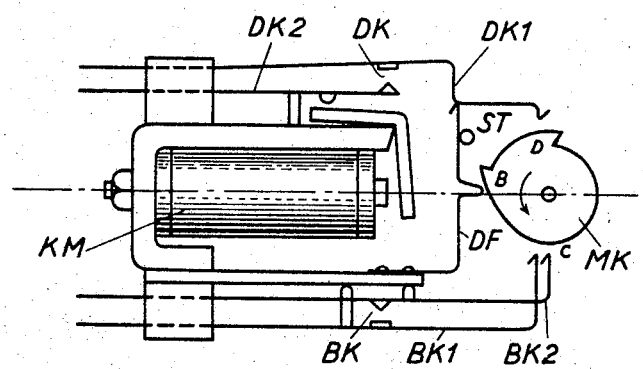
FIG. 2 shows a rotatable disc MK impelled by the meter M, contact springs actuated by the rotatable disc, as well as an electromagnet KM.
Figure 2B:
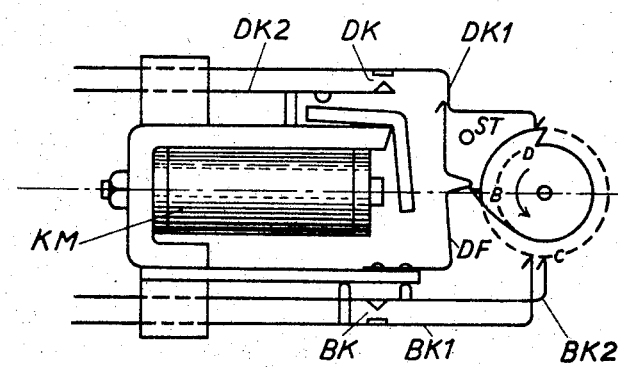

In FIG. 2 is shown the functioning of the rotatable disc MK, the locking spring DF, the electromagnet KM and the contacts DK and BK. The rotatable disc is rotated in the direction of the arrow and in a predetermined position the projection B, FIG. 2A, displaces the locking spring DF on which the contact spring DK1 rests. The contact spring DK1 falls down to the position shown in FIG. 2B and is stopped by the portion of the disc located between the projections B and D, without closing the DK-contacts.

Figure 2C:
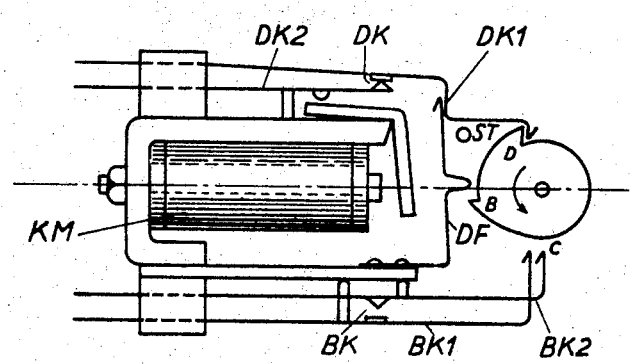

In FIG. 2A, the locking spring DF is stopped by the pin ST. In FIG. 2B, spring DF is stopped by the vertical part of the contact spring DK1. The closing of the circuit for the "Payment due"-siganl is controlled by the projection D and will not occur until the projection B has passed the locking spring DF. This is shown in FIG. 2C where the contacts DK are closed. The KM relay may be operated immediately thereafter if required whereby the contact springs DK1 and DK2 are lifted and the locking spring falls out against the pin ST. When relay KM releases its armature, spring DK1 is held in locked position according to FIG. 2A and the contact spring DK2 interrupts the contact DK.

The contact springs BK1 and BK2 are operated every time the projection B passes the position C. The form of the rotatable disc MK is in FIG. 2B indicated by dotted circles. The springs DF, BK1 and BK2 are operated only by the projection B. When projection B passes the position C, both contact springs BK1 and BK2 are at first lifted and then the spring BK1 releases and closes the contact BK. Provided the contact DK is closed, the cut out switch BR is operated (see FIG. 1). By the arrangement described the contacts DK and BK open and close very quickly.

The invention may be modified in different ways and adopted to different conditions. Thus the signal channel or telephone line L of FIG. 1 may be common to two or more subscribers by having the tone signal receiver T responsive to different tone signals or tone signal combinations.

Usually there are several subscribers in one house and in that case each subscriber may have his own telephone or two or more subscribers may have a common telephone or party-line. It is not necessary that more than one at a time of these subscribers be required to pay. In such a case the arrangement according to FIG. 3 may be adopted wherein a common tone signal receiver is provided. In this manner the cost for the charging device can be considerably reduced.

Figure 3:
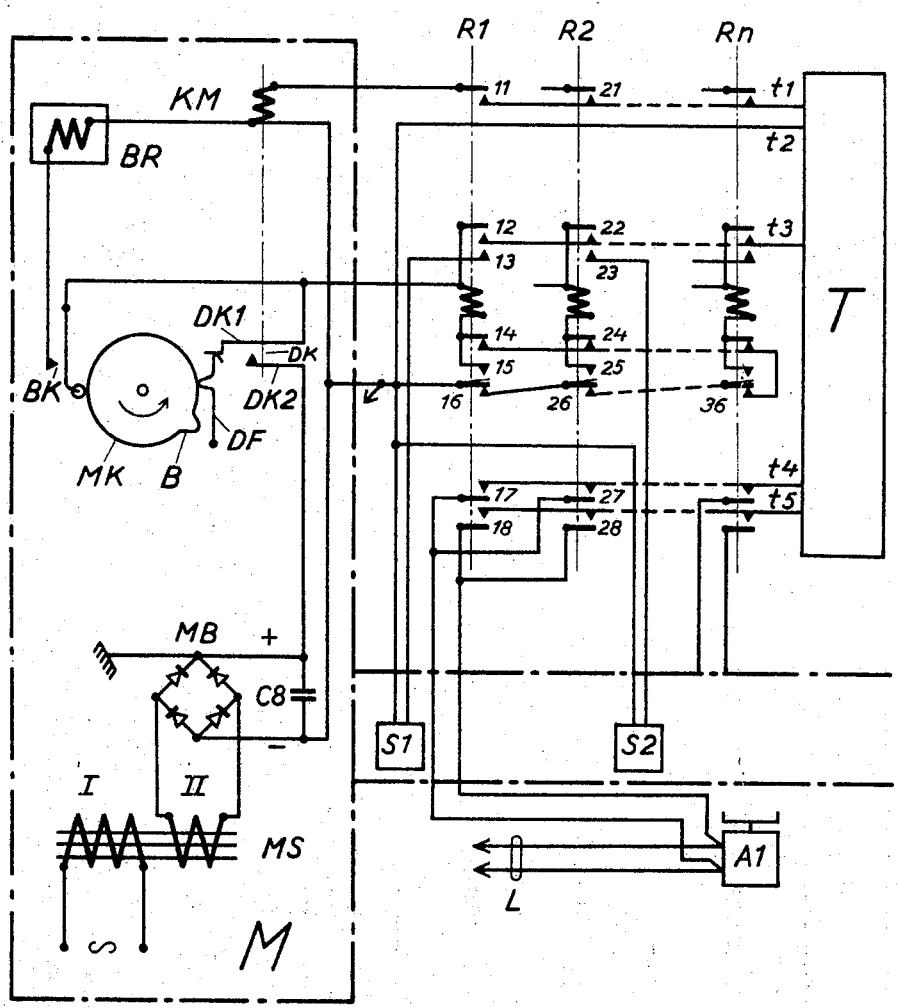
FIGS. 3-4 show embodiments wherein a common signal receiver is used for a plurality of meters.

According to FIG. 3 each one of $n$ subscribers has a relay, R1–Rn, connected in a chain circuit and each subscriber also has a meter M and a signalling arrangement S1, S2 corresponding to signal lamp DS of FIG. 1; a common tone signal receiver T being provided for all of them. The subscribers may have each one telephone line or in some way share a number of lines to which their telephone stations are connected. In the relay chain only one relay at a time can operate. The signal means S1, S2 may be a lamp or a drop indicator, a buzzer or a trigger which latter releases a visual and/or audible signal. The signal means is restored manually after a "Receipt" signal has been obtained upon the payment. The meter M in FIG. 3 corresponds in all details to the description of FIGS. 1 and 2. The tone signal receiver T may correspond to the receiver T in FIG. 1, but in this case it might be convenient to have a tone signal receiver designed in accordance with the type usually used in telephony for signalling purposes, e.g. comprising control that no undesired frequencies are present during the "Receipt"-signal. The D.C.-supply MS, MB, C8 is only provided in one of the meters M and may also be installed separately.

The arrangement according to FIG. 3 functions in the following way: When the contact spring DK1 is released and the contact DK closes, a circuit is formed through the winding of relay R1, through the contacts 14, 36 . . . 26, 16 and the D.C.-supply MB–C8. Relay R1 attracts its armature and thus the contacts 11–18 are actuated. Feeding for the tone signal receiver T is supplied through the wires t2, t3 and through the contact 12. A circuit is closed to the signalling means S1, through the contacts 12 and 13. The electromagnet KM is now connected over contact 11 to the outgoing circuit t1 of the tone signal receiver and the telephone wires L are connected to the input wires t4, t5 through the contacts 17, 18. The circuits for the relay windings R2–Rn are interrupted by the contacts 14 and 16 and relay R1 is retained by current through contact 15.

When a connection is established between the telephone station A1 and the Office, the latter sends a voice frequency signal on the wires L to the tone signal receiver T. This signal is converted to a D.C.-signal which is connected via the wire t1, through contact 11 to the electromagnet KM. When the signal ceases, the contact DK interrupts the circuit for relay R1 which releases.

In case another meter, for example the one corresponding to relay R2, has closed the contact DK, the relay R2 will operate as soon as R1 is released. Thus the contacts 21–28 are operated and consequently the signalling means S2 is actuated. The previously used telephone line L of FIG. 3 is again connected to the tone signal receiver T, this time by the contacts 27, 28. The electromagnet KM of the meter actually giving "Payment due"-signal is connected by the contact 21 to the wire t1. The relay R2 remains in operated position until the expected "Receipt"-signal is transmitted on the telephone line L.

The meter, corresponding to the relay Rn, has its individual telephone line.

The receipt of payment can be confirmed by using identical signals for all the meters and the meters are, thus, all identical. No additions or alterations are required in the telephone exchanges. The invention is, however, not limited to these conditions or to the embodiments shown in the drawings. In cases where the "Receipt"-signals can be sent by means of D.C.-signals, the tone receiver may be dispensed with.

Figure 4:
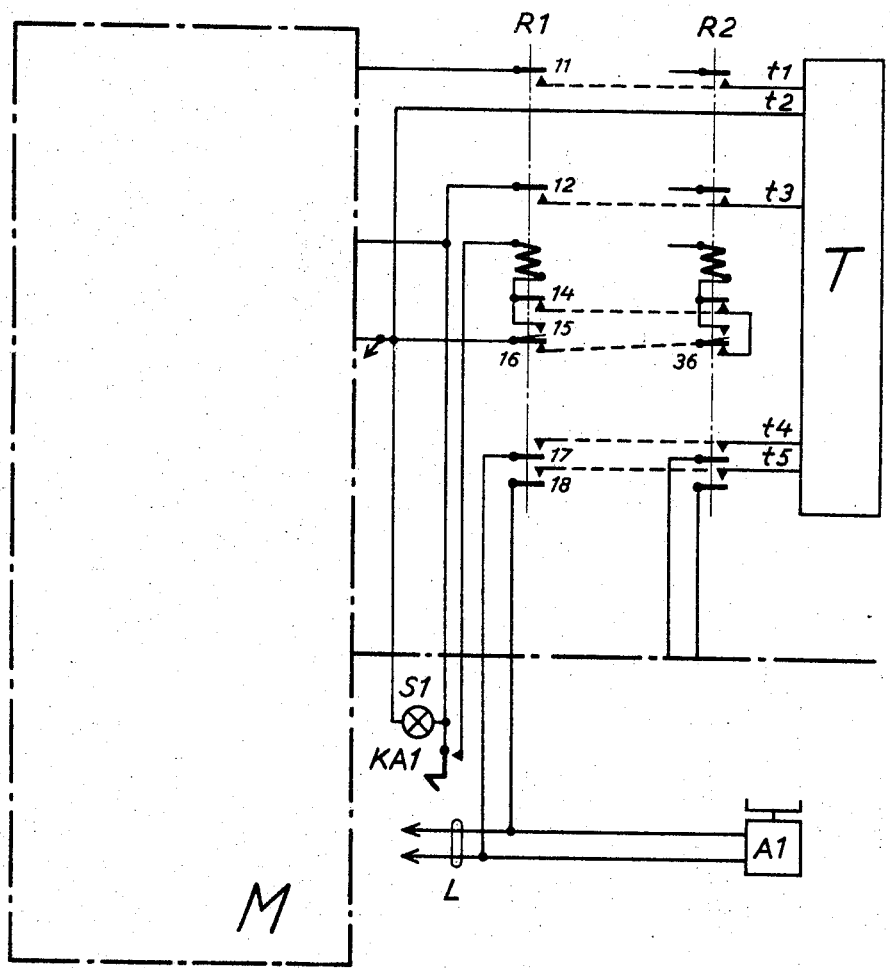

It may be a disadvantage that only one subscriber at a time may have his attention called to the "Payment-due"-signal. In the case a subscriber for some reason does not pay in due time, the electricity supply of another subscriber may be cut off through no fault of his. This disadvantage may be avoided by using the arrangement shown in FIG. 4. Every subscriber is provided with a key KA1, which has to be operated for connecting the subscriber's meter to the tone receiver and this latter to the telephone line when "Receipt"-signal is to be transmitted. The meter M in FIG. 4 is of the same construction as that shown in FIG. 3. The signal lamp S1 is lighted as soon as the consumption has reached the predetermined quantity. When the "Receipt"-signal is to be sent, the subscriber should be required to operate the key KA1 and to control that the S1-lamp goes out. When the key KA1 is operated, the relay R1 operates. The contacts 11–18 connect the tone receiver T to the wires L and to the meter M. The circuit of the S1-lamp is interrupted when the "Receipt"-signal ceases.

As according to the invention, the "Receipt"-signals are transmitted by telephone communications it may be desirable to introduce a control that prevents dialling of wrong numbers and at the same time prevents tampering with the "Receipt"-signal. To this end it might be useful to introduce a special punched card to be used for the crediting operation in an automatic accounting machine in combination with a machine for dialling the subscriber's number, whereby the identification punched on such a card corresponds to the subscriber's telephone number.

We claim:

1. A payment control system for a public utility supplying a measurable quantity of service or a product wherein a subscriber is permitted a predetermined use of the service or consumption of the product before a payment for the use or consumption, said system comprising:

a central collection station and at least one subscriber station;

a signal channel connecting said central collection station to said subscriber station;

a consumption meter means at said subscriber station for measuring the consumption of said measurable quantity;

alarm means, at said subscriber station, actuatable by said consumption meter means for indicating when a predetermined quantity of said measurable quantity has been consumed;

a control signal transmission means at said central collection station for transmitting a control signal via said signal channel to said subscriber station;

control signal receiving means associated with the subscriber station for deactuating said alarm means, said control signal receiving means being connected to said signal channel; and a switching means actuatable by said consumption meter means, after said alarm means is energized and after said consumption meter means indicates the consumption of an additional quantity, for suspending delivery of at least part of the service or product.

2. The system of claim 1, wherein said signal channel is a telecommunications channel, said control signal transmission means is a tone generator connected to said telecommunications channel, and said control signal receiving means comprises a tone signal receiver responsive to only certain kinds of tone signals.

3. The system of claim 1, comprising at least two subscriber stations, wherein said signal channel is a telecommunications channel connecting said central collection station to each of said two subscriber stations, said control signal transmission means including a tone signal generator for selectively generating first and second tone signals, and the control signal receiving means at each of said subscriber stations including a tone signal receiver responsive to only one of said tone signals.

4. The system of claim 1, wherein each subscriber station includes a consumption meter means and an alarm means, control signal receiving means being common to all of said subscriber stations and further comprising a relay-chain including one relay for each subscriber station, each relay selectively connecting the consumption meter means to the alarm means of the associated subscriber station and selectively connecting said common control signal receiving means to the associated subscriber station for deactuating the associated alarm signal means.

5. The system of claim 1, wherein said consumption meter means comprises a cam disk rotatable in response to the consumption, a contact spring, a locking means for retaining said contact spring in a locked position, means on said cam disk for releasing said contact spring to actuate said alarm means and electromagnetic means connected to said control signal receiving means for returning said contact spring to the locked position.

6. The system of claim 1, wherein said alarm means gives a visual as well as an audible signal.

7. The system of claim 2, wherein said control signal receiving means includes a voice frequency filter and a delay line means for preventing actuation of said control signal receiving means to deactuate said alarm means in response to ringing signals and undesired transient signals.

8. The system of claim 5, further comprising a locking spring for holding said contact spring in a first locked position from which it is released by said means on said cam disk to be displaced to a second locked position in which said contact spring rests against said cam disk, said cam disk having a configuration such that said contact spring will be released from said second locked position at a particular rotational position of said cam disk to actuate said alarm means, said contact spring being relockable by said locking spring while said cam disk is at said particular rotational position.

References Cited

UNITED STATES PATENTS

| 1,299,632 | 4/1919 | Stitzer et al. | 340—163 |
| 1,742,285 | 1/1930 | Shannon | 179—2 |
| 3,002,131 | 9/1961 | Gerosolina | 317—141 |

FOREIGN PATENTS 595,708 12/1947 Great Britain.

JOHN W. CALDWELL, *Acting Primary Examiner.*

DAVID G. REDINBAUGH, *Examiner.*

W. S. FROMMER, *Assistant Examiner.*